Dec. 4, 1962 C. F. REAVIS 3,066,312
COLLAPSIBLE SITZ BATH
Filed Jan. 30, 1961 5 Sheets-Sheet 1
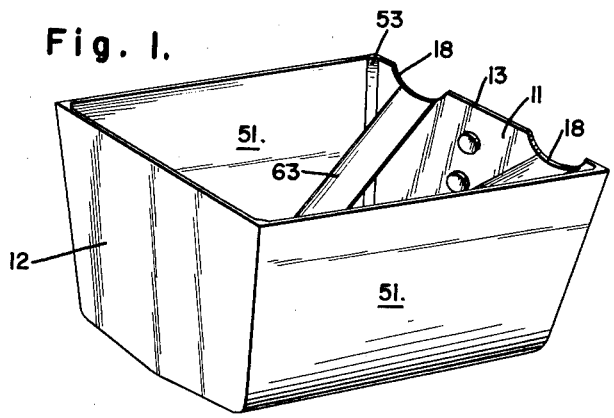
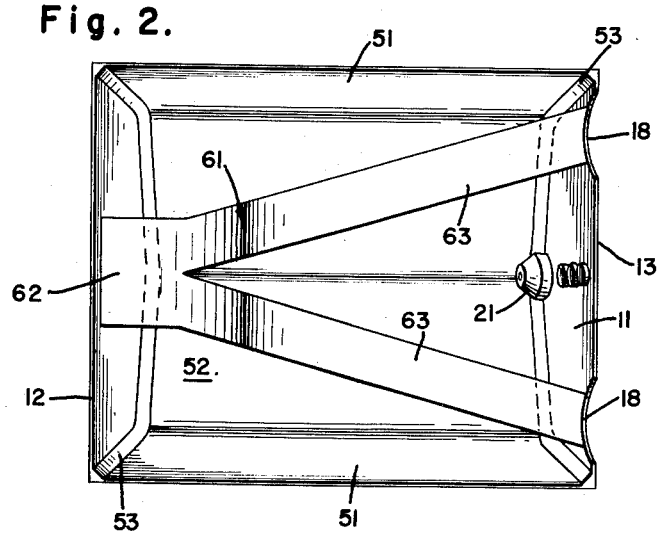
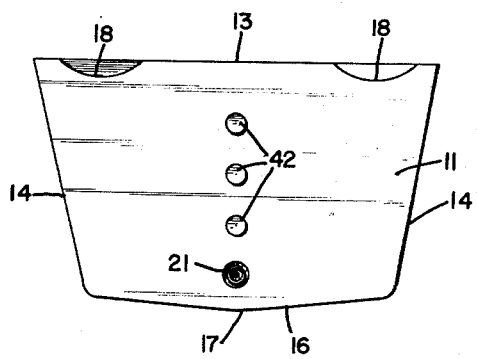
INVENTOR.
Charles F. Reavis
BY
Townsend and Townsend
Attorneys Dec. 4, 1962

C. F. REAVIS 3,066,312

COLLAPSIBLE SITZ BATH

Filed Jan. 30, 1961

INVENTOR.
Charles F. Reavis
BY

Dec. 4, 1962 C. F. REAVIS 3,066,312
COLLAPSIBLE SITZ BATH
Filed Jan. 30, 1961 5 Sheets-Sheet 4
Fig. 9.
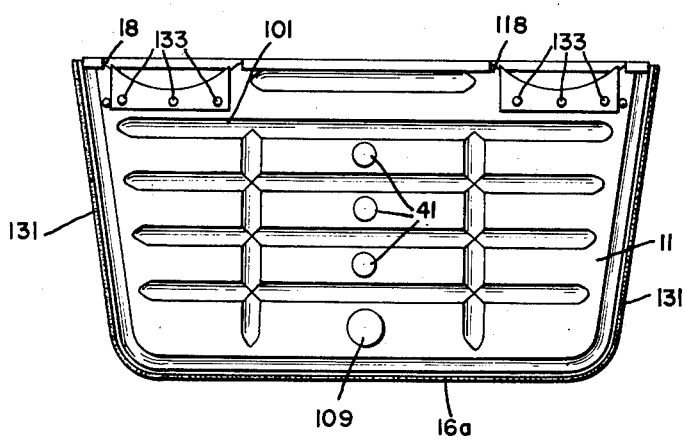
Fig. 10.
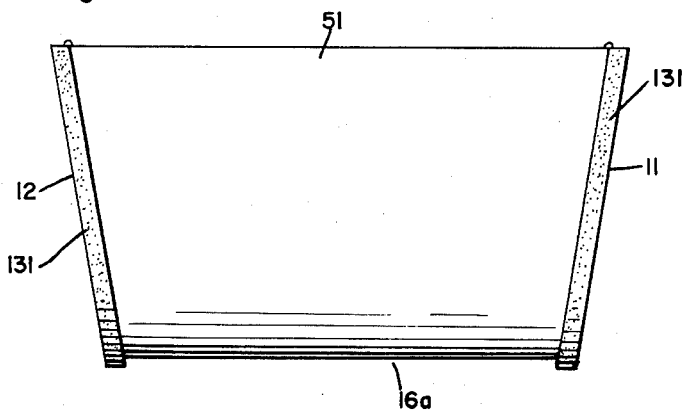
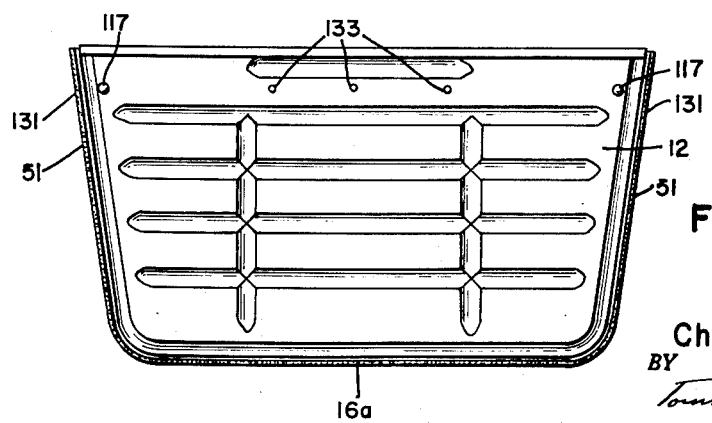
Fig. 11.
INVENTOR.
Charles F. Reavis
BY
Townsend and Townsend
attorneys Dec. 4, 1962 C. F. REAVIS 3,066,312
COLLAPSIBLE SITZ BATH
Filed Jan. 30, 1961 5 Sheets-Sheet 5
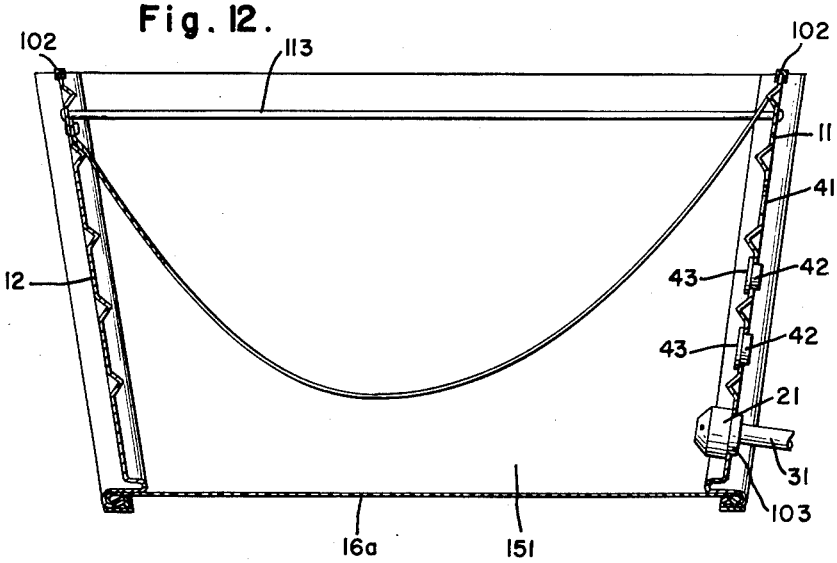
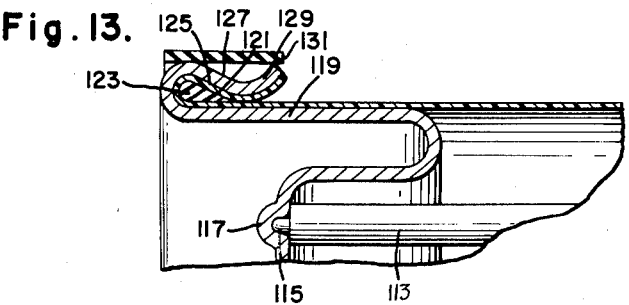
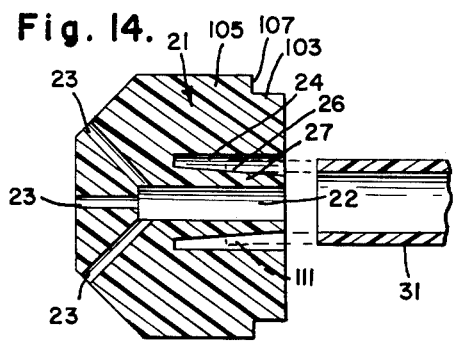
INVENTOR.
Charles F. Reavis
BY
Townsend and Townsend
attorneys

United States Patent Office 3,066,312
Patented Dec. 4, 1962

3,066,312
COLLAPSIBLE SITZ BATH
Charles F. Reavis, 1455 Norton St., Oroville, Calif.
Filed Jan. 30, 1961, Ser. No. 86,841
4 Claims. (Cl. 4—7)

This invention relates to a new and useful improvement in collapsible, portable sitz baths. More particularly this invention relates to a small size tub which supports the body of the user in sitting position, and is a continuation-in-part of my copending application Serial No. 837,065, filed August 31, 1959, entitled "Collapsible Sitz Bath," and abandoned February 8, 1961.

One of the principal features of the present invention is the fact that it employs a plastic bottom and sides which permit the bath to be folded into a compact shape for transportation and storage. A particular feature of the invention is the fact that no special means is required to hold the bath in its position of use inasmuch as the water in the bath performs this function.

Another feature of the invention is the fact that it may be positioned in an ordinary bathtub or other suitable location and removed between uses, thereby permitting normal usage of the bathtub.

A still further feature of the invention is the provision of means whereby the level of the water in the sitz bath may be conveniently adjusted.

A still further feature of the invention is the provision of means for promoting the circulation of water in the bath and agitation of the parts of the body of the user being bathed.

A still further feature is in the provision of a novel means for bonding the rigid end members and the flexible plastic member together in the formation of the bath. More particularly, these ends are provided with an open ended channel housing a liner. The flexible plastic, which forms the bottom and sides of the bath, has its edges looped about this liner in the channel and one edge of the rigid ends is crimped to lock the flexible plastic in place. By use of this bonding means no sharp edges are brought to bear against the plastic and a sturdy, tear resistant bond between the plastic and the end members is obtained.

Other objects of the present invention will become apparent upon reading the following specification and referring to the accompanying drawings in which similar characters of reference represent corresponding parts in each of the several views.

In the drawings:

FIG. 1 is a perspective view of the invention;

FIG. 2 is a top plan view;

FIG. 3 is an end elevation viewed from the right in FIG. 2;

FIG. 9 is an end elevation view from the right of FIG. 8;

FIG. 10 is a side elevation view of the embodiment of FIG. 8;

FIG. 11 is an end elevation as viewed from the left of FIG. 8;

FIG. 12 is a longitudinal vertical sectional view of the embodiment of FIG. 8;

FIG. 13 is an enlarged fragmentary top view of a corner of the embodiment of FIG. 8, and FIG. 14 is an enlarged exploded sectional view showing the interconnection of the water hose and bath fitting of the embodiment of FIG. 8.

Figure 4:
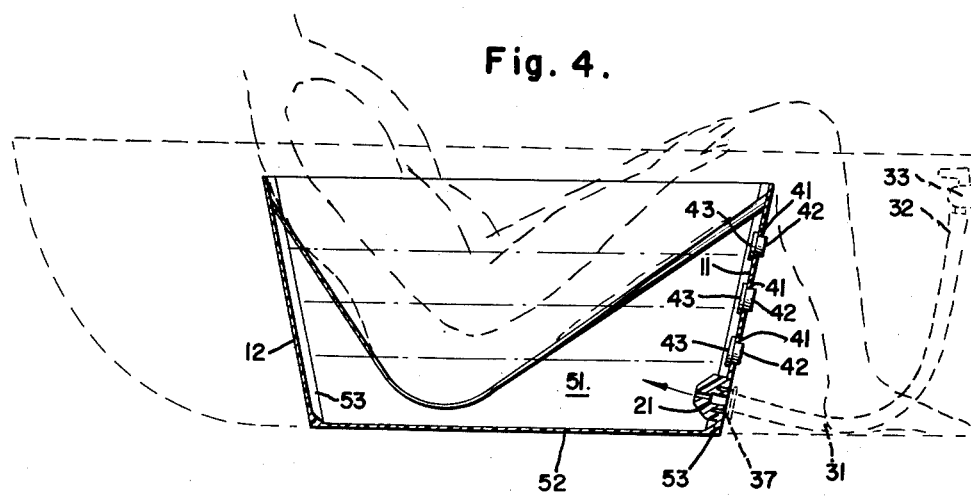
FIG. 4 is a longitudinal vertical sectional view of the bath shown in use in a tub.

Referring now to the embodiment shown in FIGS. 1–7, the bath which is the subject of this invention employs a first end 11 and a second end 12 which are substantially identical in external outline and are formed of a relatively stiff plastic material. The ends shown in FIGS. 1–4 inclusive have a generally trapezoidal shape, the end 11 having a horizontal top edge 13, downwardly-inwardly slanted side edges 14, and a bottom edge 16 which in the form shown in FIG. 3 has slightly upwardly inclined edges extending outwardly from the apex 17. In the form shown in FIG. 6 the bottom edge 16a is straight. The different bottom edges 16 and 16a are used for different shapes of bathtubs in which the bath is to be used, it being understood that some bathtubs have flat bottoms whereas others have sloping bottoms and the choice of the different ends 11 and 12 adapts the bath to the particularly shaped bathtub.

The first end 11 has arcuate cutouts 18 on the upper edge 13 which receive and support the under side of the knee of the user. These cutouts may be provided with detachable rubber or heat treated neoprene pads for added comfort. Adjacent the bottom of the end 11 there is installed a fitting 21 shown in detail in FIG. 5. Fitting 21 has a central main port 22 which receives water and at the inner edge of the tub has a plurality of discharge ports 23 which are directed in diverse directions to promote circulation and distribution of the water in the tub. The number and direction of the discharge ports is subject to wide variation determined by the type of water agitation desired by the user.

Surrounding the inlet port 22 is an annular groove 24, the inner surface 26 of which is downwardly-outwardly tapered so that the wall 27 between port 22 and groove 24 is tapered. Adjacent the bottom of surface 26 is a circumferential groove 28 which is inwardly directed. Fitting 21 receives water hose 31, the end 32 of which is fastened by any convenient means to a water faucet 33. The opposite end 34 is formed with an internal circumferential bead 36 which registers with the groove 28. Surrounding the end 34 is a thimble 37 having a knurled collar 38. When the hose 31 is attached to the fitting 21, the end 34 fits into the groove 24 and the bead 36 fits into the groove 28. Thereafter the thimble 37 is pushed into the groove 24 and this locks the hose 31 in the fitting 21.

The end member 11 is also provided with a plurality of hole 41 at different elevations. The holes 41 receive plugs 42 having enlarged heads 43. In use, one of the plugs 42 is removed permitting water to discharge through the open hole 41 which has no plug. Thus water is received in the bath through fitting 21 and distributed and circulated in the bath and discharged through one of the holes 41. The selection of the particular hole which remains open determines the height of the water in the bath.

The second end member 12 is preferably plain. Interconnecting the ends 11 and 12 is a sheet of flexible plastic which forms the sides 51 and bottom 52. Preferably a relatively thick fillet is formed at the joint between the ends 11 and 12 and the sides 51 and bottom 52 to prevent tearing away of the plastic.

Figure 7:
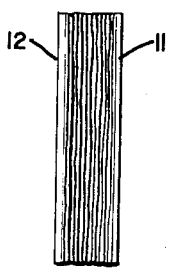
FIG. 7 is a perspective view showing the bath collapsed.

It will be noted that the sides 11 and 12 slant outwardly-upwardly. This feature of construction plus the weight of the water in the bath hold the bath in its proper position of use despite the fact that the sides 51 and bottom 52 are of a flexible material. Nevertheless, when the water is removed, the bath may be folded to a collapsed position wherein the sides 11 and 12 are parallel and spaced apart a short distance and the sides 51 and end 52 are folded therebetween (FIG. 7).

To support the body of the user a sling 61 is employed. Sling 61 is a generally V-shaped member, the apex 62 being bonded to the side 12 by heat sealing or adhesive or other convenient means near the top edge of side 12 adjacent the center. The diverging branches 63 of sling 61 are attached to the end 11 immediately under the cutouts 18 in a manner similar to the manner in which the end 62 is attached. The shape of the sling 61 permits support of the body of the user in a sitting position wherein the water admitted through the fitting 21 may circulate in an effective manner.

Figure 6:
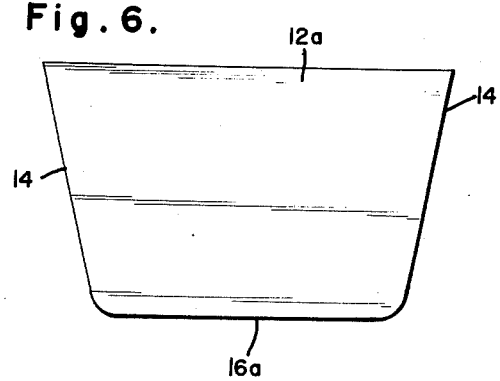
FIG. 6 is an end elevation as viewed from the left of FIG. 2 of a modified shape of bath.

In the form of the end 12a shown in FIG. 6 the bottom end 16a of the ends is relatively straight as contrasted with the slanted edge shown in FIG. 3. This accommodates tubs which are slanted toward the center at a relatively steep angle.

FIGS. 8–14 illustrate a modification of the embodiment of FIGS. 1–7 and parts of this embodiment corresponding to those of the first embodiment bear similar characters of reference and will not be described in detail hereinafter except insofar as necessary to describe the distinguishing characteristics of this embodiment.

The bath shown in FIGS. 8–14 employs end members 11 and 12, preferably made of a light durable metal such as aluminum. The end members are substantially identical in external outline and are provided with a plurality of spaced apart ribs 101 which impart a high degree of strength for supporting the user's weight. Along the upper margins of end members 11 and 12 are detachable U-shaped members 102 which serve as bumpers for the bath.

The bottom edge 16a of the bath or tub is shown as straight although it is understood that this edge may also be of the sloping type to permit use of the bath with bathtubs having solping bottoms.

Figure 5:
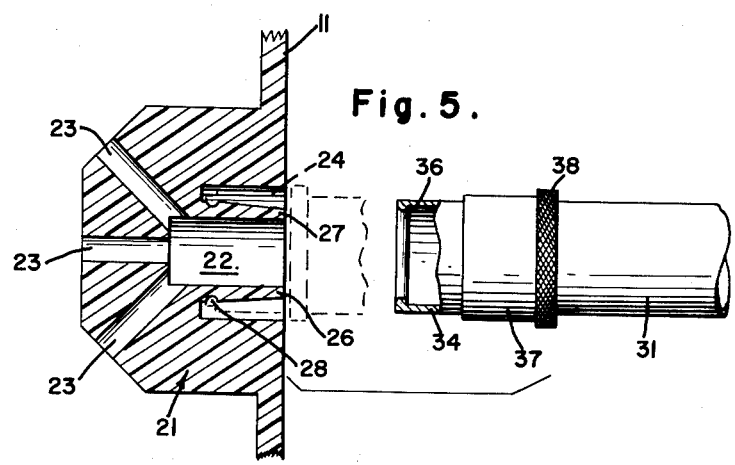
FIG. 5 is an enlarged exploded sectional view showing the interconnection of the water hose and the bath fittings.

In FIG. 14, there is shown a modified form of the fitting 21 illustrated in FIG. 5. In this embodiment the fitting 21 includes an annular sleeve 103 having a diameter reduced from that of body portion 105 to form an abutting shoulder 107. The sleeve fits snugly through opening 109 in end member 11 and the shoulder 107 contacts the portion of the end member surrounding opening 109 to form a liquid tight seal. One end of a hose 31 is attached to the bathtub faucet and the other end is inserted into groove 24 of the fitting until it occupies the doted line position illustrated at 111. The groove 24 in the fitting has a tapered inner surface 26, as in the case of the fitting shown in FIG. 3, and when fitted into position, the end portion of hose 31 is caused to spread thereby maintaining the hose securely in position.

Figure 8:
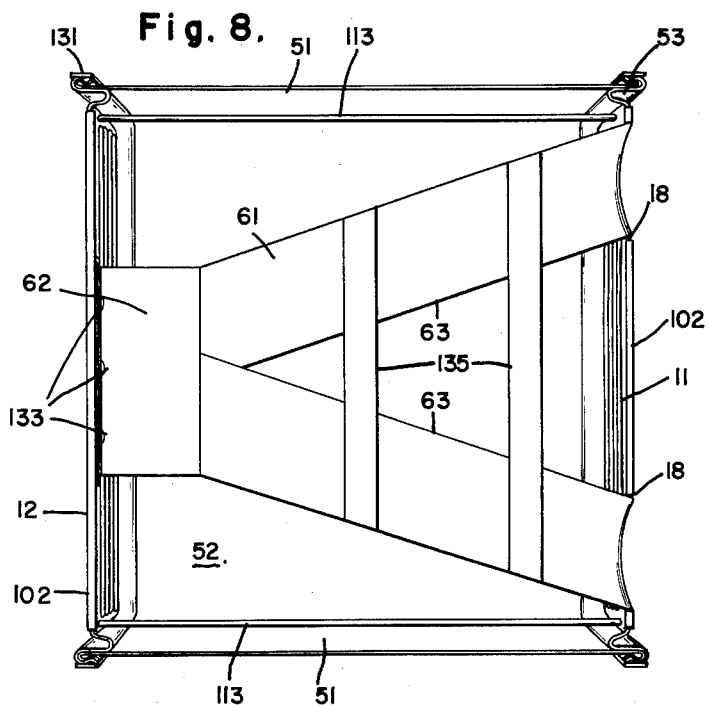
FIG. 8 is a top plan view of the second embodiment of the invention.

When the bath is filled with water, its shape together with the weight of the water will hold the tub in its proper position of use as is also true with the first embodiment of the invention. However, it may be desirable to maintain the upper margins of the tub substantially rectangular against a tendency toward angular displacement. For this purpose, as shown in FIGS. 8 and 13, support bars 113 are provided. These bars include beads 115 at their outer ends for registry with recesses 117 formed in end members 11 and 12. The bars are mounted on opposite sides of the bath as shown in FIG. 8, and will bias the end members away from each other to apply a stretching force on the flexible plastic sheet which forms the sides 51 and bottom 52 of the bath.

As is obvious, the plastic material is subjected to substantial stresses when supporting the weight of the user and has a tendency to tear where the bond is formed between the plastic and the rigid end members 11 and 12. To overcome such tendencies a novel bonding device is provided. The side and lower margins of the end members 11 and 12 include a substantially S-shaped bend which forms an open-ended slot or channel 121 into which a liner 123 preferably made of soft plastic or rubber material is placed. The edges 125 of the flexible plastic member are threaded or looped about the liner 123 and the end portions 127 of end members 11 and 12 are crimped intwardly at a point slightly removed from their their terminal edges 129 to lock the flexible plastic sheet in place in such a way as to prevent contact of the plastic sheet with jagged edges. A bumper 131 is then secured about the side and lower margins of the end members 11 and 12 and covers edge 129. Thus, by employing a locking device of the type described, an air resistant and secure bond is had between the rigid end members and the flexible plastic.

Turning now to FIG. 8, the sling 61 is shown attached to end members 11 and 12 by lift dot fasteners 133 which permit the sling to be removably attached to the bath. Additionally, sling 61 includes cross members 135 for supporting diverging branches 63 of the sling.

In operation, the unit is opened from a collapsed position similar to that shown in FIG. 7. If support bars 133 are provided, they are inserted in depressed portions 117 of end members 11 and 12. Fitting 21 is connected to the bottom hole in end member 11 from the inside of the tub, hose 31 is attached to the bathtub water faucet and the opposite hose end placed in annular groove 24. The three divergent nozzle holes 23 are turned to a horizontal position and one or more rubber plugs 42 placed in holes 41 to maintain the water at the desired level. After the tub is filled, when water circulation or agitation is desired, the faucet is turned on. The overflow will drain from the unplugged port 41. Temperature may be regulated by use of a thermometer and after use water is drained by removal of the plugs following which the bath may be folded and stored.

From the above it is seen that a collapsible and portable light weight sitz bath is provided, arranged to dispose the user in proper body position with a maximum of comfort, exposing only the afflicted areas of the body and which utilizes present bathroom facilities without requiring special frames, rigs and the like.

Although the foregoing invention has been described in some detail by way of illustration and example for purposes of clarity and understanding, it is understood that certain changes and modifications may be practiced within the spirit of the invention as limited only by the scope of the appended claims.

I claim:

1. A collapsible sitz bath comprising a tub including a first and second rigid end, each end formed from a ribbed piece of material of generally trapezoidal shape slanded upwardly-outwardly; a thin sheet of fluid impervious plastic material manually foldable at any point along its transverse and longitudinal axes forming the sides and bottom of said tub; a generally sinusoidally shaped channel along the side and bottom margins of each said end having a liner member positioned therein, the end margins of said plastic member positioned in said channel and looped about said liner member; one edge of said channel being crimped to lock said plastic member in bonded engagement with said first and second rigid ends; said first end formed with two spaced apart open top cut outs for the undersides of the knees of the user; a body supporting sling in said bath having a generally V-shape, the apex of said sling being bonded to the center and the upper edge of one of said rigid ends and the outer ends of said sling are fitted over the edges of said cut outs, said tub including detachably mounted supports interiorally of said tub and comprising a pair of rods positioned on opposite sides of said tub and mounted between said rigid ends.

2. A collapsible sitz bath comprising a tub including a first and second relatively rigid end, each end formed of a ribbed piece of material of generally trapezoidal shape slanted upwardly-outwardly, a thin sheet of fluid impervious plastic material manually foldable at any point along its transverse and longitudinal axes joined to the side and bottom edges of each of said ends and comprising the sides and bottom of said tub; support means for said tub comprising a pair of rods positioned on opposite sides of said tub and mounted between said first and second ends; means for detachably mounting said rods a body supporting sling within said tub mounted to said rigid ends and having a generally V-shape; means for detachably mounting said sling cutouts formed in said first rigid end for the under sides of the knees of the user; a plurality of holes formed in said first end at different elevations; plugs for closing off any preselected number of holes and a fitting for a water hose removably attached to said first end, said fitting having means to distribute and circulate water in said tub in a preselected manner.

3. A collapsible sitz bath according to claim 2 in which both rigid ends have generally sinusoidally shaped channel members formed along the sides and bottom margins thereof, said channel members including a liner member positioned therein, the end margins of said plastic sheet being looped about said liner, a portion of said channel being crimped to bond said plastic sheet to said rigid ends.

4. A collapsible sitz bath comprising a tub including a pair of opposed relatively rigid ends, a thin sheet of fluid impervious material foldable at any point along its transverse and longitudinal axes interconnecting and attached to said ends and forming the bottom and sides of said tub, and a V-shaped sling within said tub attached to each of said ends.

References Cited in the file of this patent

UNITED STATES PATENTS

| | | |
|---|---|---|
| 23,701 | Perry et al. | Apr. 19, 1859 |
| 633,398 | Straube | Sept. 19, 1899 |
| 2,382,637 | Jacks | Aug. 14, 1945 |
| 2,529,983 | White | Nov. 14, 1950 |
| 2,869,140 | Wiedemann | Jan. 20, 1959 |
| 2,872,686 | Osborn et al. | Feb. 10, 1959 |

FOREIGN PATENTS

| | | |
|---|---|---|
| 540,017 | France | Apr. 11, 1922 |